US012719057B2

(12) United States Patent
Piao et al.

(10) Patent No.: US 12,719,057 B2
(45) Date of Patent: Aug. 25, 2026

(54) ELECTRODE FOR SECONDARY BATTERY AND SECONDARY BATTERY COMPRISING THE SAME

(71) Applicant: LG ENERGY SOLUTION, LTD., Seoul (KR)

(72) Inventors: Lilin Piao, Daejeon (KR); Sangwook Woo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 614 days.

(21) Appl. No.: 17/777,918

(22) PCT Filed: Jul. 19, 2021

(86) PCT No.: PCT/KR2021/009282
§ 371 (c)(1),
(2) Date: May 18, 2022

(87) PCT Pub. No.: WO2022/025507
PCT Pub. Date: Feb. 3, 2022

(65) Prior Publication Data

US 2022/0407068 A1 Dec. 22, 2022

(30) Foreign Application Priority Data

Jul. 28, 2020 (KR) ........................ 10-2020-0093964

(51) Int. Cl.
*H01M 4/583* (2010.01)
*H01M 10/052* (2010.01)
*H01M 4/02* (2006.01)

(52) U.S. Cl.
CPC ......... *H01M 4/583* (2013.01); *H01M 10/052* (2013.01); *H01M 2004/021* (2013.01); *H01M 2004/027* (2013.01)

(58) Field of Classification Search
None
See application file for complete search history.

(56) References Cited

U.S. PATENT DOCUMENTS

2007/0166616 A1 7/2007 Kim et al.
2012/0135312 A1* 5/2012 Takahashi ............. H01M 4/366 427/113
2014/0186702 A1 7/2014 Takahata
2015/0155557 A1 6/2015 Kwon et al.
2015/0349341 A1* 12/2015 Hoshi .................. H01M 4/133 252/182.1
2016/0060125 A1* 3/2016 Chung .................. C01B 32/05 423/445 R
2017/0062823 A1 3/2017 Yamaguchi et al.
2018/0287145 A1* 10/2018 Lee ....................... H01M 4/625
2018/0309162 A1 10/2018 Jung et al.
2019/0305308 A1 10/2019 Lee et al.
2021/0083273 A1 3/2021 Song et al.
2021/0265630 A1 8/2021 Choi et al.
2022/0093906 A1* 3/2022 Ma ....................... H01M 4/587

FOREIGN PATENT DOCUMENTS

CN 108352505 A 7/2018
CN 108701816 A 10/2018
JP 2007-194201 A 8/2007
JP 5787196 B2 9/2015
JP 6264344 B2 1/2018
JP 2019-507460 A 3/2019
JP 2019-508839 A 3/2019
KR 10-2015-0065041 A 6/2015
KR 10-2018-0035693 A 4/2018
KR 10-2018-0124659 A 11/2018
KR 10-2018-0125312 A 11/2018
KR 10-2019-0090497 A 8/2019
KR 10-2063809 B1 1/2020
KR 10-2020-0028258 A 3/2020
KR 10-2020-0073801 A 6/2020
KR 10-2020-0074552 A 6/2020
KR 10-2020-0088237 A 7/2020
WO 2013/018182 A1 2/2013
WO 2019/078544 A1 4/2019

OTHER PUBLICATIONS

Zhang et al. Capturing the swelling of solid electrolyte interphase in lithium metal batteries (Year: 2022).*
Extended European Search Report dated Jun. 30, 2023 in corresponding European Patent Application No. 21850586.5.
International Search Report and Written Opinion dated Nov. 13, 2021 issued in corresponding International Application No. PCT/KR2021/009282 dated Nov. 10, 2021 (partial translation).

* cited by examiner

*Primary Examiner* — Jeffrey T Barton
*Assistant Examiner* — Anna E. Gould
(74) *Attorney, Agent, or Firm* — Bryan Cave Leighton Paisner LLP

(57) ABSTRACT

A negative electrode for secondary battery includes a negative electrode current collector; a first active material layer in which a first negative electrode slurry containing a first negative electrode active material is coated onto the negative electrode current collector; and a second active material layer in which a second negative electrode slurry containing a second negative electrode active material is coated onto the first active material layer, wherein the first negative electrode active material contains natural graphite having an mesopore volume of $0.6*10^{-3}$ $cm^3/g$ or more and $2.5*10^{-3}$ $cm^3/g$ or less, and the second negative electrode active material contains artificial graphite.

6 Claims, No Drawings

ELECTRODE FOR SECONDARY BATTERY AND SECONDARY BATTERY COMPRISING THE SAME

CROSS CITATION WITH RELATED APPLICATION(S)

This application claims the benefit of Korean Patent Application No. 10-2020-0093964 filed on Jul. 28, 2020 with the Korean Intellectual Property Office, the disclosure of which is incorporated herein by reference in its entirety.

TECHNICAL FIELD

The present disclosure relates to an electrode for secondary battery, and more particularly, to an electrode for secondary battery which improves cell performance.

BACKGROUND

With the technology development and increased demand for mobile devices, demand for secondary batteries as energy sources has been rapidly increasing. Among these secondary batteries, a lithium secondary battery having high energy density and a high voltage, a long cycle lifespan, and a low self-discharge rate is commercially available and widely used.

In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

In addition, with the growing interest in environmental issues, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density and discharge voltage is being actively conducted, a part of which are in the commercialization stage.

As a negative electrode active material of such a lithium secondary battery, carbon materials are mainly used, and mainly natural graphite or artificial graphite is used. In the case of artificial graphite, it is excellent in output characteristics and lifespan characteristics, but is relatively low in the adhesive force, which causes a problem that electrode detachment occurs during electrode coating, drying, and rolling processes. In the case of natural graphite, it is excellent in the adhesive force, but there is a problem that it has many mesopores and excessive reactions with electrolytes occur. Thus, in recent years, electrodes have been produced by mixing natural graphite and artificial graphite in a certain ratio and coating the mixture as a single layer on a current collector, but due to the side reaction with the electrolyte by mesopores of natural graphite, the cycle durability is low and the thickness swelling ratio is also high, which is still disadvantageous in cell performance.

Accordingly, there is a growing need for the development of a negative electrode having improvements in both the electrode adhesive force and the cell performance.

DETAILED DESCRIPTION OF THE INVENTION

Technical Problem

It is an object of the present disclosure to provide an electrode for secondary battery which improves cell performance, and a secondary battery comprising the same.

The objects of the present disclosure are not limited to the aforementioned objects, and other objects which are not described herein should be clearly understood by those skilled in the art from the following detailed description.

Technical Solution

According to one embodiment of the present disclosure, there is provided a negative electrode for secondary battery comprising: a negative electrode current collector; a first active material layer in which a first negative electrode slurry containing a first negative electrode active material is coated onto the negative electrode current collector; and a second active material layer in which a second negative electrode slurry containing a second negative electrode active material is coated onto the first active material layer, wherein the first negative electrode active material contains natural graphite having an mesopore volume of $0.6*10^{-3}$ $cm^3/g$ or more and $2.5*10^{-3}$ $cm^3/g$ or less, and the second negative electrode active material contains artificial graphite.

The first negative electrode active material may contain natural graphite having an average particle size (D50) of 17 um or more and 25 μm or less.

The first negative electrode active material may be composed of the natural graphite.

An adhesive force between the first active material layer and the negative electrode current collector may be 21 gf/cm or more and 40 gf/cm or less.

The second negative electrode active material may contain artificial graphite having an average particle size (D50) of 10 um or more and 30 um or less.

The second negative electrode active material may be composed of the artificial graphite.

The content of the second negative electrode active material contained in the second active material layer may be larger than the content of the first negative electrode active material contained in the first active material layer.

The first negative electrode active material and the second negative electrode active material may be contained in a ratio of 10 to 40 parts by weight:60 to 90 parts by weight.

According to another embodiment of the present disclosure, there is provided a secondary battery comprising the negative electrode for secondary battery.

A thickness swelling ratio of the secondary battery in a charged state may be 24% or less.

Advantageous Effects

According to embodiments of the present disclosure, the cell performance of the secondary battery can be improved.

The effects of the present disclosure are not limited to the effects mentioned above and additional other effects not described above will be clearly understood from the description of the appended claims by those skilled in the art.

DETAILED DESCRIPTION OF THE EMBODIMENTS

Hereinafter, various embodiments of the present disclosure will be described in detail so that those skilled in the art can easily carry out them. The present disclosure may be modified in various different ways, and is not limited to the embodiments set forth herein.

A negative electrode for a secondary battery and a secondary battery including the same according to one embodiment of the present disclosure will be described below.

A negative electrode for a secondary battery according to one embodiment of the present disclosure includes a negative electrode current collector, a first active material layer, and a second active material layer. More specifically, the first active material layer and the second active material layer may be arranged on one surface of the negative electrode current collector, or may be arranged on both surfaces thereof. The first active material layer is located on the negative electrode current collector, and the second active material layer is located on the first active material layer. That is, the first active material layer is located between the negative electrode current collector and the second active material layer.

Accordingly, the first active material layer containing natural graphite having excellent adhesion force comes into contact with the negative electrode current collector and thus, the negative electrode for a secondary battery of the present disclosure can be improved in the electrode adhesive force.

The first active material layer is formed by coating a first negative electrode slurry containing the first negative electrode active material.

The first negative electrode active material is natural graphite having a mesopore volume of $0.6*10^{-3}$ $cm^3/g$ or more and $2.5*1010^{-3}$ $cm^3/g$.

The first negative electrode active material may have a mesopore volume of $0.6*10^{-3}$ $cm^3/g$ or more and $2.5*10^{-3}$ $cm^3/g$ or less unlike general natural graphite. Accordingly, the negative electrode for a secondary battery of the present disclosure may reduce in mesopores, and can reduce side reactions with the electrolyte as compared to general natural graphite. Further, the first negative electrode active material is reduced in mesopores, and thus can be improved in cycle durability and swelling performance as compared to a negative electrode containing general natural graphite. Therefore, the negative electrode for the secondary battery according to one embodiment of the present disclosure can improve the cell performance.

Here, the mesopore can be measured by a BET method (Brunauer-Emmett-Teller). More specifically, when measuring BET, the pore distribution can be confirmed through a BJH plot. In addition, the pore volume corresponding to the mesopore size, which is the mesopore volume, can be measured as the total value of dVp/DDp ($cm^3/g$).

In order to reduce the side reaction with the electrolyte, it is preferable that natural graphite is reduced in mesopores. However, in the case of general natural graphite, it has a particle diameter of 9 um or more and 17 um or less, and has a mesopore volume ranging from $2.9*10^{-3}$ $cm^3/g$ to $4.2*10^{-3}$ $cm^3/g$. In particular, in the case of general natural graphite, there are more internal pores than the particle size and thus, the mesopore volume is increased in general natural graphite having a larger particle size than general natural graphite having a smaller particle size. General natural graphite with a small particle size can be used in order to reduce the mesopore volume. However, the smaller the particle size, the larger the specific surface area. There is a problem in that more side reactions with the electrolyte proceed due to the increased specific surface area.

On the other hand, the first negative electrode active material may be natural graphite having an average particle diameter (D50) of 15 um or more and 30 um or less. More preferably, the first negative electrode active material may be natural graphite having an average particle diameter (D50) of 17 um or more and 25 μm or less. In one example, the first negative electrode active material may be natural graphite having an average particle diameter (D50) of 18 um or more and 20 um or less. Accordingly, in the negative electrode for a secondary battery of the present disclosure, the particle size of natural graphite is larger than that of a general natural negative electrode, and side reactions with the electrolyte due to the specific surface area can be reduced. However, if the size of the first negative electrode active material is too large, the specific surface area can be excessively reduced, thereby reducing adhesive force.

Further, the first negative electrode active material of the present disclosure may be natural graphite having a mesopore volume of $0.6*10^{-3}$ $cm^3/g$ or more and $2.5*10^{-3}$ $cm^3/g$ or less. More preferably, the first negative electrode active material of the present disclosure may be natural graphite having an mesopore volume of $1.0*10^{-3}$ $cm^3/g$ or more and $2.0*10^{-3}$ $cm^3/g$ or less. In one example, the first negative electrode active material of the present disclosure may be natural graphite having a mesopore volume of $1.6*10^{-3}$ $cm^3/g$ or more and $1.8*10^{-3}$ $cm^3/g$ or less. Therefore, the negative electrode for a secondary battery of the present disclosure has a mesopore volume lower than that of general natural graphite, so that a side reaction with the electrolyte due to the mesopore volume can be reduced.

On the other hand, when the mesopore volume of the first negative electrode active material of the present disclosure is excessively large, such as more than $2.5*10^{-3}$ $cm^3/g$, side reactions between the first negative electrode active material and the electrolyte may increase, whereby there is a problem in that cell durability such as cell capacity and negative electrode swelling are reduced.

On the other hand, when the mesopore volume of the first negative electrode active material of the present disclosure is too small, such as less than $0.6*10^{-3}$ $cm^3/g$, the electrolyte infiltration of the first negative electrode active material is deteriorated, and the impregnation uniformity of the first negative electrode active material in the electrode may also be lowered. Further, the charge transfer resistance may become larger and thus the rapid charging performance may be deteriorated.

Here, the adhesive force between the first active material layer and the negative electrode current collector may be 20 gf/cm or more and 40 gf/cm or less. Accordingly, the first active material layer has excellent adhesion to the negative electrode current collector, thereby preventing electrode detachment from occurring during electrode coating, drying, and rolling processes.

Further, the shape of the natural graphite contained in the first negative electrode active material is not limited, and it may be flake graphite, grain graphite, or amorphous graphite. Preferably, it may be amorphous graphite having a large contact area between particles in order to improve the adhesive force.

The second active material layer is formed by coating a second negative electrode slurry containing the second negative electrode active material.

The second negative electrode active material may be artificial graphite having an average particle diameter (D50) of 10 um or more and 30 um or less. More preferably, the second negative electrode active material may be artificial graphite having an average particle diameter (D50) of 15 um or more and 22 um or less. When the size of the second negative electrode active material is less than 10 um, the specific surface area is greatly increased and so more side reaction with the electrolyte proceeds, and thereby, cell performance may be degraded. When the size of the second negative electrode active material is larger than 30 um, the specific surface area can be reduced and thus the adhesive force can be reduced, and further the particle size becomes larger and thus the rapid charging performance may be deteriorated.

Further, the shape of the artificial graphite contained in the second negative electrode active material is not limited, and the artificial graphite may be in a form of a powder, a flake, a block, a plate, or a rod. Preferably, the artificial graphite may be in a form of a flake or a plate, in which a moving distance of lithium ions is shorter in order to have the most excellent lifespan characteristics and output characteristics.

Further, in the negative electrode according to one embodiment of the present disclosure, the content of the first negative electrode active material contained in the first active material layer and the second negative electrode active material contained in the second active material layer can be contained in a ratio of the first negative electrode active material: the second negative electrode active material=10 to 40 parts by weight:60 to 90 parts by weight. More preferably, the first negative electrode active material contained in the first active material layer and the second negative electrode active material contained in the second active material layer can be contained in a ratio of first negative electrode active material:second negative electrode active material=20 to 30 parts by weight: 70 parts by weight to 80 parts by weight.

When the content of the first negative electrode active material is contained in a smaller amount outside the above-mentioned range, the content of natural graphite is relatively small and thus, the adhesive force of the entire active material layer may decrease, electrode detachment may still occur during electrode coating, drying, and rolling processes. Further, when the content of the first negative electrode active material is contained in a larger amount outside the above-mentioned range, the content of artificial graphite is relatively small, lifespan characteristics of the entire active material layer may be reduced, and thus overall cell performance may be deteriorated.

Each of the first active material layer and the second active material layer may further include a binder and a conductive material in addition to the first negative electrode active material or the second active material. The conductive material is used in order to impart conductivity to the electrode, and the conductive material can be used without particular limitation as long as it has electronic conductivity without causing chemical changes in the battery to be configured.

Specific examples thereof include carbon-based materials such as carbon black, acetylene black, ketjen black, channel black, furnace black, lamp black, thermal black, carbon graphene and carbon fiber; graphite such as natural graphite and artificial graphite; metal powder or metal fibers such as copper, nickel, aluminum and silver; conductive whiskey such as zinc oxide and potassium titanate; conductive metal oxides such as titanium oxide; or a conductive polymer such as a polyphenylene derivative, and any one alone or a mixture of two or more of them may be used. The conductive material may be contained in an amount of 1% by weight to 30% by weight, based on the total weight of the electrode.

The binder performs a role of improving adhesion between positive electrode active material particles and an adhesive force between the positive electrode active material and the current collector. In one example, the binder may include a polymer material. Specific examples thereof include polyvinylidene fluoride (PVDF), a vinylidene fluoride-co-hexafluoropropylene copolymer (PVDF-co-HFP), polyvinyl alcohol, polyacrylonitrile, carboxymethyl cellulose (CMC), starch, hydroxypropylcellulose, regenerated cellulose, polyvinyl pyrrolidone, polytetrafluoroethylene, polyethylene, polypropylene, an ethylene-propylene-diene monomer (EPDM), a sulfonated EPDM, styrene butadiene rubber (SBR), fluoro rubber, or various copolymers thereof, and one alone or a mixture of two or more selected therefrom may be used as the binder. The binder may be contained in an amount of 1% by weight to 30% by weight with respect to the total weight of the electrode.

The negative electrode current collector is not particularly limited as long as it has high conductivity without causing chemical changes to the battery. For example, copper, stainless steel, aluminum, nickel, titanium, calcined carbon, copper or stainless steel having a surface treated with carbon, nickel, titanium, silver, etc., aluminum-cadmium alloy, and the like may be used. In addition, the negative electrode current collector may generally have a thickness of 3 μm to 500 μm, and, similarly to the positive electrode current collector, can have fine unevenness formed on the surface thereof to enhance the binding strength of the negative electrode active material. For example, it may be used in various forms such as films, sheets, foils, nets, porous bodies, foams and nonwoven fabrics.

The secondary battery according to another embodiment of the present disclosure may include the negative electrode for the secondary battery. More specifically, the secondary battery may include an electrode assembly including the negative electrode for secondary battery, the positive electrode, and a separator interposed between the secondary battery negative electrode and the positive electrode, and the electrolyte.

The positive electrode may be produced by coating a positive electrode slurry including a positive electrode active material, a binder, a conductive material, and the like to a positive electrode current collector, similarly to the negative electrode for a secondary battery.

The positive electrode may also be produced in a form in which a positive electrode slurry including a positive electrode active material is coated onto a positive electrode current collector, and the positive electrode slurry may also further include the conductive material and binder as described above, together with the positive electrode active material.

The positive electrode active material may include, for example, a layered compound such as lithium cobalt oxide ($LiCoO_2$), lithium nickel oxide ($LiNiO_2$), or a compound substituted with one or more transition metals; lithium manganese oxides such as chemical formulae $Li_{1+x}Mn_{2-x}O_4$ (where x is 0 or more and 0.33 or less), $LiMnO_3$, $LiMn_2O_3$, $LiMnO_2$, lithium copper oxide ($Li_2CuO_2$); vanadium oxides such as $LiV_3O_8$, $LiFe_3O_4$, $V_2O_5$, and $Cu_2V_2O_7$; a Ni-site type lithium nickel oxide represented by chemical formula. $LiNi_{1-x}M_xO_2$ (where M=Co, Mn, Al, Cu, Fe, Mg, B or Ga, and x=0.01 or more and 0.3 or less); lithium manganese composite oxide represented by chemical formulae $LiMn_{2-x}M_xO_2$ (where M is Co, Ni, Fe, Cr, Zn or Ta, and x is 0.01 or more and 0.1 or less) or $Li_2Mn_3MO_8$ (where M is Fe, Co, Ni, Cu or Zn); lithium manganese composite oxide having a spinel structure represented by $LiNi_xMn_{2-x}O_4$; $LiMn_2O_4$ in which a part of Li in the chemical formula is substituted with an alkaline earth metal ion; a disulfide compound; $Fe_2(MoO_4)_3$, and the like, without being limited thereto.

The positive electrode current collector is not particularly limited as long as it has conductivity while not causing chemical changes to the battery, and for example, stainless steel, aluminum, nickel, titanium, calcined carbon, or aluminum or stainless steel having a surface treated with carbon, nickel, titanium, silver, etc. may be used. In addition, the positive electrode current collector may have a thickness of 3 μm to 500 μm, and may have fine irregularities formed on the surface of the current collector to increase the adhesion of the positive electrode active material. For example, it may be used in various forms such as films, sheets, foils, nets, porous bodies, foams, and nonwoven fabrics.

The separator separates the negative electrode and the positive electrode, and provides a passage for lithium ions to migrate. Any separator can be used without particular limitation as long as it is generally used as a separator in a lithium secondary battery. In particular, a separator having excellent moisture-retention ability for an electrolyte while having low resistance to the migration of electrolyte ions is preferable. Specifically, a porous polymer film, for example, a porous polymer film made of polyolefin-based polymers such as ethylene homopolymer, propylene homopolymer, ethylene/butene copolymer, ethylene/hexene copolymer, and ethylene/methacrylate copolymer, or a laminated structure having two or more layers thereof can be used. Further, a conventional porous nonwoven fabric, for example, a nonwoven fabric made of high melting point glass fiber, polyethylene terephthalate fiber, or the like can be used. Further, in order to secure heat resistance or mechanical strength, a coated separator containing a ceramic component or a polymer material can be used, and optionally, a single layer or a multilayer structure can be used.

In addition, the electrolyte used in the present disclosure may include, but is not limited to, an organic liquid electrolyte, an inorganic liquid electrolyte, a solid polymer electrolyte, a gel type polymer electrolyte, a solid inorganic electrolyte, a molten inorganic electrolyte or the like which can be used in the production of a lithium secondary battery.

Specifically, the electrolyte solution may include an organic solvent and a lithium salt.

As the organic solvent, any solvent can be used without particular limitation as long as it can serve as a medium through which ions involved in the electrochemical reaction of the battery can migrate. Specifically, as the organic solvent, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethylcarbonate (DEC), methylethylcarbonate (MEC), ethylmethylcarbonate (EMC), ethylene carbonate (EC), or propylene carbonate (PC); an alcohol-based solvent such as ethyl alcohol or isopropyl alcohol; nitriles such as R—CN (where R is a straight, branched or cyclic C2-C20 hydrocarbon group, and may include a double-bond aromatic ring or ether bond); amides such as dimethylformamide; dioxolanes such as 1,3-dioxolane; or sulfolanes may be used. Among them, the carbonate-based solvent is preferable, and a mixture of a cyclic carbonate (e.g., ethylene carbonate, propylene carbonate, etc.) having high ionic conductivity and a high-dielectric constant, which may increase charge/discharge performance of the battery, and a low-viscosity linear carbonate-based compound (e.g., ethyl methyl carbonate, dimethyl carbonate, diethyl carbonate, etc.) may be more preferably used. In this case, when the cyclic carbonate and the chain carbonate are mixed and used in a volume ratio of about 1:1 to about 1:9, the electrolyte can exhibit excellent performance.

The lithium salt may be used without particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$, or the like may be used as the lithium salt. It is preferable to use the lithium salt in a concentration rage of 0.1 M to 2.0 M. If the concentration of the lithium salt is within the above range, since the electrolyte has an appropriate conductivity and viscosity, excellent electrolyte performance can be exhibited, and lithium ions can effectively migrate.

In order to improve the lifespan characteristics of the battery, suppress a reduction in battery capacity and improve discharge capacity of the battery, the electrolyte solution may further include, for example, one or more additives such as a halo-alkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinones, N,N-substituted imidazolidine, ethylene glycol dialkyl ether, an ammonium salt, pyrrole, 2-methoxy ethanol, or aluminum trichloride, in addition to the above electrolyte components. In this case, the additive may be included in an amount of 0.1% to 5% by weight based on the total weight of the electrolyte solution.

Below, the contents of the present disclosure will be described by way of examples, but the following examples are for illustrative purposes only, and the scope of the present disclosure is not limited thereto.

Example 1

Natural graphite having a mesopore volume of $1.6*10^{-3}$ $cm^3/g$ and an average particle diameter (D50) of 20 um as a first negative electrode active material, SBR as a binder, CMC as a thickener and carbon black as a conductive material was weighed so as to have a ratio of natural graphite:SBR:CMC:carbon black=96.6:1.3:1.1:1.0, to which distilled water was added and mixed to prepare a first negative electrode slurry.

Artificial graphite with an average particle diameter (D50) of 22 um as a second negative electrode active material, SBR as a binder, CMC as a thickener and carbon black as a conductive material were weighted so as to have a ratio of artificial graphite:SBR:CMC:carbon black=95.6:2.3:1.1:1.0, to which distilled water was added and mixed to prepare a second negative electrode slurry.

The prepared first negative electrode slurry was coated onto a copper foil electrode current collector to form a first active material layer. The prepared second negative electrode slurry was coated onto the first active material layer to form a second active material layer, thereby producing a negative electrode. At this time, the negative electrode includes natural graphite contained in the first active material layer and artificial graphite contained in the second active material layer in a ratio of 30 parts by weight:70 parts by weight.

Example 2

Unlike Example 1, natural graphite having a mesopore volume of $1.7*10^{-3}$ $cm^3/g$ and an average particle diameter (D50) of 18 um of the first negative electrode active material was used, and natural graphite contained in the first active material layer and artificial graphite contained in the second active material layer were contained in a ratio of 20 parts by weight:80 parts by weight. Except for the above, a negative electrode was produced in the same manner as in Example 1.

Example 3

Unlike Example 1, natural graphite having an internal mesopore volume of 1.7*$10^{-3}$ $cm^3/g$ and an average particle diameter (D50) of 18 um as the first negative electrode active material was used. Except for the above, a negative electrode was produced in the same manner as in Example 1.

Comparative Example 1

Unlike Example 1, natural graphite having a mesopore volume of 3.2*$10^{-3}$ $cm^3/g$ and an average particle diameter (D50) of 11 um as the first negative electrode active material was used, and natural graphite contained in the first active material layer and artificial graphite contained in the second active material layer were contained in a ratio of 20 parts by weight:80 parts by weight. Except for the above, a negative electrode was produced in the same manner as in Example 1.

Comparative Example 2

Unlike Example 1, natural graphite having a mesopore volume of 4.2*$10^{-3}$ $cm^3/g$ and an average particle diameter (D50) of 9 um as the first negative electrode active material was used. Except for the above, a negative electrode was produced in the same manner as in Example 1.

Comparative Example 3

Unlike Example 1, natural graphite having an internal mesopore volume of 3.2*$10^{-3}$ $cm^3/g$ and an average particle diameter (D50) of 11 um as the first negative electrode active material was used, and natural graphite contained in the first active material layer and artificial graphite contained in the second active material layer were contained in a ratio of 80 parts by weight:20 parts by weight. Except for the above, a negative electrode was produced in the same manner as in Example 1.

Comparative Example 4

Unlike Example 1, natural graphite having a mesopore volume of 4.2*$10^{-3}$ $cm^3/g$ and an average particle diameter (D50) of 9 um as the first negative electrode active material was used, and natural graphite contained in the first active material layer and artificial graphite contained in the second active material layer were contained in a ratio of 70 parts by weight:30 parts by weight. Except for the above, a negative electrode was produced in the same manner as in Example 1.

Comparative Example 5

Unlike Example 1, natural graphite having a mesopore volume of 2.9*$10^{-3}$ $cm^3/g$ and an average particle diameter (D50) of 17 um as the first negative electrode active material was used, and natural graphite contained in the first active material layer and artificial graphite contained in the second active material layer were contained in a ratio of 20 parts by weight:80 parts by weight. Except for the above, a negative electrode was produced in the same manner as in Example 1.

Experimental Example 1

For the positive electrode, LCO ($LiCoO_2$) was used as the positive electrode active material, and mixed with carbon black and PVDF, and the mixture was added to NMP so as to have a ratio of the positive electrode active material: carbon black:PVDF=97.68 parts by weight: 1.2 parts by weight: 1.12 parts by weight put, thereby preparing a positive electrode slurry, which was coated onto the current collector of aluminum foil so as to have a loading amount of 19.5 $mg/cm^2$, thereby producing a positive electrode.

The produced positive electrode and the negative electrodes produced in Examples 1 to 3 and Comparative Examples 1 to 5 were prepared, a PE separator was interposed between the positive electrode and the negative electrode, and an electrolyte solution containing 1M $LiPF_6$ and 0.5 wt % VC additive in a solvent of EC:EMC=2:8 was used to prepare coin full cells.

The charging range of each coin full cell was set from SOC0 to SOC95. The first cycle was charged and discharged at 0.1C, the second cycle was charged and discharged at 0.2C, from the 3rd cycle to the 30th cycle were charged and discharged at 0.5C, and then the change in thickness during charging and discharging was measured, and the cycle swelling performance (swelling ratio was converted into the rate of change in the thickness of the charged state, and the results are shown in Table 1 below.

TABLE 1

| | Swelling ratio@$30^{th}$cycle (charge) | Electrode adhesive force (gf/cm) |
|---|---|---|
| Example 1 | 22 | 26 |
| Example 2 | 21 | 23 |
| Example 3 | 21 | 23 |
| Comparative Example 1 | 25 | 17 |
| Comparative Example 2 | 25 | 17 |
| Comparative Example 3 | 27 | 19 |
| Comparative Example 4 | 26 | 19 |
| Comparative Example 5 | 26 | 17 |

In the following, Experimental Example 1 and Table 1 will be described together.

First, referring to Examples 1 to 3 and Comparative Examples 1, 2, and 5, in which the content ratio of the first negative electrode active material and the second negative electrode active material in the first active material layer and the second active material layer are similar as a whole of the negative electrode, it can be confirmed that when natural graphite having a mesopore volume of 0.6*$10^{-3}$ $cm^3/g$ or more and 2.5*$10^{-3}$ $cm^3/g$ or less were contained in the first active material layer according to the present disclosure, it exhibits more improved cell swelling performance and excellent electrode adhesive force as a whole, as compared with Comparative Examples 1, 2, and 5 which contain natural graphite having a mesopore volume of 2.9*$10^{-3}$ $cm^3/g$ or more in the first active material layer. Although the mesopore volume of the natural graphite contained in the first active material layer of Examples 1 to 3 was 0.6*$10^{-3}$ $cm^3/g$ or more and 2.5*$10^{-3}$ $cm^3/g$ or less and thus the particle size of natural graphite is large, it can be confirmed that the cell swelling performance due to mesopores is improved.

In addition, when comparing Comparative Example 1 and Comparative Example 3, and Comparative Examples 2 and 4, respectively, in which the configuration is the same, but the content ratio of the first active material and the second active material is different, it can be confirmed that the electrode adhesive force is increased when the content of natural graphite contained in the first active material layer is larger than the content of artificial graphite contained in the second active material layer. However, with respect to cell swelling perforce, when the content of natural graphite contained in the first active material layer is larger than the content of artificial graphite contained in the second active material layer, it can be confirmed that the cell swelling performance is deteriorated.

Thereby, it can be confirmed that the natural graphite contained in the first active material layer has excellent adhesive force, but is deteriorated in the cycle durability due to the large mesopore volume as compared with artificial graphite, and is high in the thickness swelling ratio, which is disadvantageous in the cell swelling performance. Accordingly, it can be confirmed that the natural graphite contained in the first active material layer and the artificial graphite contained in the second active material layer need to be contained in an appropriate content ratio as in Examples 1 to 3.

Although the invention has been shown and described with reference to the preferred embodiments, the scope of the present disclosure is not limited thereto, and various modifications and improvements made by those skilled in the art using the basic concepts of the present disclosure, which are defined in the appended claims, also belong to the scope of the present disclosure.

The invention claimed is:

1. A negative electrode for a secondary battery, comprising:

a negative electrode current collector;

a first active material layer in which a first negative electrode slurry containing a first negative electrode active material is coated onto the negative electrode current collector; and a second active material layer in which a second negative electrode slurry containing a second negative electrode active material is coated onto the first active material layer, wherein the first negative electrode active material contains natural graphite having an average particle size (D50) of 18 μm or more and 20 μm or less, and a mesopore volume of $1.6*10^{-3}$ $cm^3/g$ or more and $1.8*10^{-3}$ $cm^3/g$ or less, wherein the second negative electrode active material contains artificial graphite, wherein a ratio of the first negative electrode active material to the second negative electrode active material is 10 to 40 parts by weight: 60 to 90 parts by weight, and wherein an adhesive force between the first active material layer and the negative electrode current collector is 21 gf/cm or more and 40 gf/cm or less.

2. The negative electrode for a secondary battery of claim 1, wherein:

the first negative electrode active material consists of the natural graphite.

3. The negative electrode for a secondary battery of claim 1, wherein:

the second negative electrode active material contains artificial graphite having an average particle size (D50) of 10 μm or more and 30 μm or less.

4. The negative electrode for secondary a battery of claim 3, wherein:

the second negative electrode active material consists of the artificial graphite.

5. A secondary battery comprising the negative electrode of claim 1.

6. The secondary battery of claim 5, wherein:

a thickness swelling ratio of the secondary battery in a charged state is 24% or less.

* * * * *